July 15, 1941.  H. J. BASHAM  2,249,679
STUFFING BOX GLAND
Filed Dec. 18, 1939
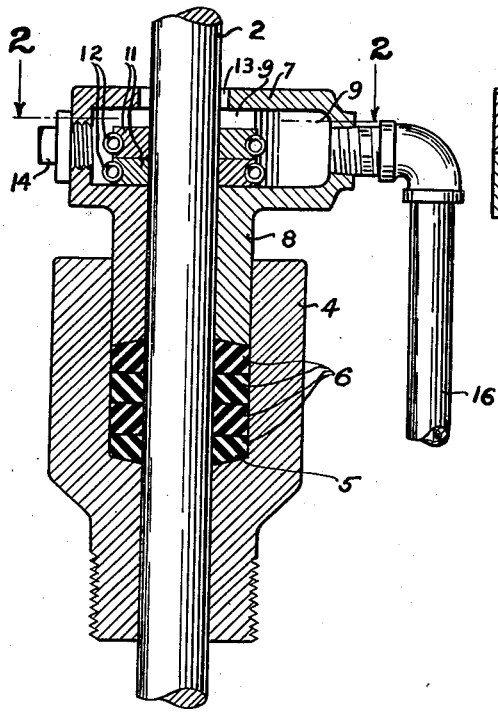
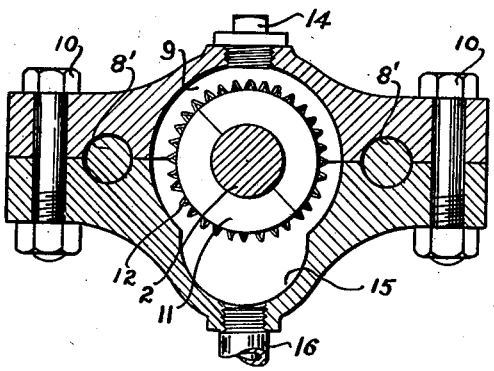
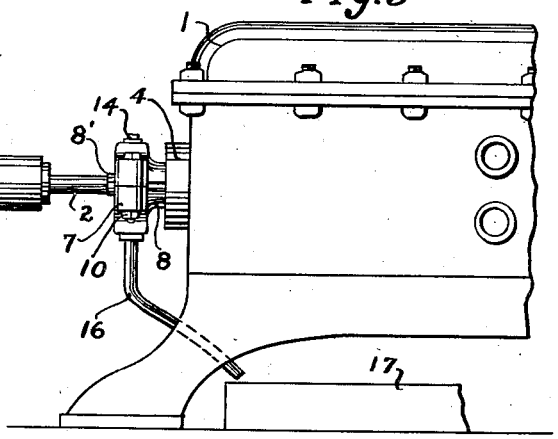
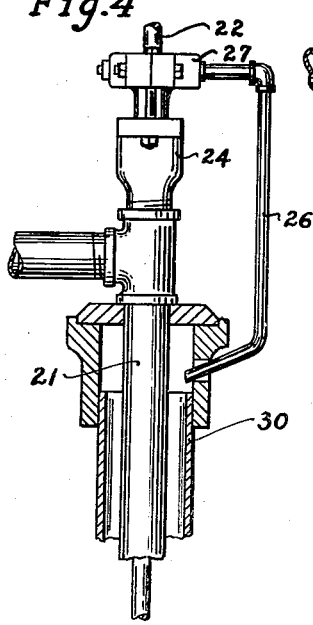
Inventor
Henry J. Basham
By J. Preston Swecker
his Attorney Patented July 15, 1941

2,249,679

UNITED STATES PATENT OFFICE 2,249,679

STUFFING BOX GLAND

Henry J. Basham, Wichita Falls, Tex.

Application December 18, 1939, Serial No. 309,903

3 Claims. (Cl. 286—21)

This invention relates to an improvement in stuffing box glands and more particularly to a combined stuffing box gland and wiper for the polish rod of a reciprocating pump.

Pumps that operate by a reciprocating movement of a polish rod are usually provided with a stuffing box around the rod where the same extends through the outside casing of the pump. These stuffing boxes have a tendency to leak, and although troughs are usually installed under the stuffing boxes to catch the oil and convey it into sumps, frequently the wind will blow the oil away from the troughs or the latter will become plugged up with sand, grass or other foreign substances, causing the oil to overflow on the ground around or beneath the pumps, resulting in an unsightly and often dangerous condition. Frequently this condition causes the pump and its foundation to work loose, resulting in breakage or replacement with attendant expense. It is not practical to keep a man at each pump continuously to note the operation of the pump and to prevent the overflow of oil or its accumulation around the pump, and when a leakage occurs or the trough becomes stopped up, this continues for many hours frequently before the pumper or gauger returns to check the condition of the pump.

The object of this invention is to combine with a stuffing box a gland that coacts with the stuffing box to wipe off the oil passing through the packing of the stuffing box to prevent the waste of the oil on the ground and to direct it into a sump or other receptacle, which will keep the polish rod clean and yet lubricated; it will prevent the adherence of sand or foreign particles on the polish rod for movement thereby into the stuffing box where these act to injure the packing thereof and cause wear on the polish rod; and it serves to collect and carry off the oil that does pass through the stuffing box.

In carrying out this object, I have combined a stuffing box and its packing with a gland that interfits with the stuffing box, holding the packing in place and has a chamber therein surrounding the polish rod with a wiper that fits on the polish rod in the chamber and tends to wipe the oil from the rod, keeping the portion of the rod that moves out of the gland, clean and free of any collection of sand or other foreign matter thereon. The oil wiped from the rod is carried off from the chamber into a sump or other desired point, thereby keeping the polish rod clean and saving wear thereon.

A preferred embodiment of the invention is shown in the accompanying drawing, in which:

Fig. 1 is a longitudinal sectional view through the combined stuffing box and gland as applied to a polish rod, parts being in elevation;

Fig. 2 is a transverse sectional view therethrough on the line 2—2 of Fig. 1;

Fig. 3 is a side elevation of a portion of a jerker pump illustrating the stuffing box and gland applied thereto; and Fig. 4 is a similar view partly in section, showing the invention applied to a reciprocating deep well pump.

The invention is adapted for use on reciprocating rods, particularly of the character used in reciprocating pumps. One form of pump is illustrated in Fig. 3, known in the art as a jerker pump which is designated generally by the numeral 1 and is provided with a polish rod 2, normally actuated by the pitman 3, which polish rod is connected with and reciprocates the usual pump piston (not shown) which operates in the pump.

At the point where the polish rod 2 enters the casing of the pump 1, a stuffing box 4 is provided having a recess 5 therein with packing rings 6, seated in the recess and closely fitting around the polish rod 2. Usually the packing rings 6 fit tightly around the polish rod to prevent the leakage of oil or fluid from the casing of the pump as the polish rod reciprocates into and out of the casing for operating the pump piston. The packing rings 6 are confined at the outer end of the recess 5, being compressed to insure a tight fit.

At the outer end of the stuffing box 4 is a packing gland designated generally by the numeral 7 which has a reduced sleeve portion 8, fitting into the open end of the recess 5 for compressing the packing rings 6, being drawn inward by retaining bolts 8'. At the outer end of the sleeve 8 is formed a chamber 9 of preferably greater diameter than the polish rod 2. The packing gland 7 is preferably constructed in two parts capable of being fitted together around the polish rod to allow assembly or disassembly thereof, without the necessity for disconnecting the pump pitman from the polish rod, which parts are connected together by bolts 10, as shown in Fig. 2.

Located in the chamber 9 of the gland 7 are wiper rings 11, preferably split for assembly around the polish rod 2 with the sections confined by springs or other resilient means 12 to maintain a tight fit of the wiper rings on the polish rod. The combined thickness of the wiper rings 11 is less than the depth of the chamber 9 axially of the reciprocating rod to permit of shifting movement of the wiper rings from side to side of the chamber during the reciprocating movement of the polish rod to increase the effectiveness of the wiping action thereon for removing any liquid or foreign matter from the surface of the polish rod to prevent the accumulation of sediment or foreign matter in the chamber 9 and to agitate the same, so that it will drain freely therefrom. The outer side of the chamber 9 preferably has an enlarged orifice 13 therein of appreciably greater diameter than the polish rod, so as not to bear upon the rod, and thereby permitting the wiper rings to remove effectively the oil or foreign matter on the rod during the reciprocating movement thereof. One side of the chamber 9 is provided with an inspection opening closed by a plug 14 screwed into place and capable of removal for inspection of the wiper rings 11.

The chamber 9 is provided with a depression 15 in the lower side thereof which has a drain tube 16, extending therefrom to a pan or other receptacle 17, so as to convey the fluid directly into the receptacle to prevent its being blown over the ground around the pump.

During the reciprocating movement of the polish rod into and out of the casing of the pump, some of the oil is carried on the polish rod through the casing. Initially the packing rings 6 may be adjusted sufficiently tight to prevent leakage of the oil past the stuffing box but the reciprocating movement of the polish rod soon results in sufficient wear on the packing rings to allow some of the oil to leak thereby on the polish rod. Such leakage will be collected by the wiper rings 11 in the chamber 9 of the gland, permitting the oil to be carried off through the drain tube 16 to the desired point or receptacle. This also keeps the portion of the polish rod that moves out of the stuffing box on each stroke of the pump sufficiently clean, so as to prevent the accumulation of sand or other foreign particles thereon that would otherwise be directed into the stuffing box and would thereby cause damage to the packing rings. Such foreign substances are wiped off by the rings 11 and prevented from reaching the packing rings. The sectional construction of both the gland and the wiper enables it to be installed or removed without the necessity of removing the piston from the head.

The invention is shown in Fig. 4 as applied to a deep well pump designated generally by the numeral 21, having a stuffing box 24 in the upper end thereof closed by a gland 27, substantially of the construction illustrated in Figs. 1 and 2, and having a drainage tube 26 for directing the leakage oil back into the casing 30 of the well and preventing the same from being carried upward on the polish rod 22, as described above.

I claim:

1. A stuffing box gland comprising a structure having a chamber therein adapted to receive a reciprocating rod therethrough, and means in the chamber for applying a wiping action to the periphery of the rod, said wiping means being of substantially less total thickness than the depth of the chamber providing a substantial degree of freedom of movement of the wiping means with the rod axially of the chamber sufficient to produce agitation in the chamber.

2. A stuffing box gland structure comprising a stuffing box adapted to receive a reciprocating rod therethrough and having a packing therein for surrounding the rod, a gland having a sleeve portion bearing against the packing, said gland having a chamber therein at the outer end of the sleeve portion adapted to receive the reciprocating rod therethrough, and means in the chamber for applying a wiping action to the periphery of the rod, said wiping means being of substantially less total thickness than the depth of the chamber providing a substantial degree of freedom of movement of the wiping means with the rod axially of the chamber sufficient to produce agitation in the chamber.

3. A stuffing box gland structure comprising a stuffing box adapted to receive a reciprocating rod therethrough and having a packing therein for surrounding the rod, a gland having a sleeve portion bearing against the packing, said gland having a chamber therein at the outer end of the sleeve portion adapted to receive the reciprocating rod therethrough, and one or more wiping rings in the chamber for applying a wiping action to the periphery of the rod, the total thickness of said wiping ring or rings being substantially less than the depth of the chamber axially of the rod providing a substantial degree of freedom of movement of the wiping ring or rings with the rod axially of the chamber sufficient to produce agitation in the chamber, said chamber having a depressed sump in one side thereof to receive oil wiped from the rod and having a discharge orifice in the bottom of said sump.

HENRY J. BASHAM.